United States Patent [19]

Hart et al.

[11] Patent Number: 4,619,952

[45] Date of Patent: Oct. 28, 1986

[54] RESINOUS BLENDS OF EPOXY AND ACRYLIC RESINS AND THE USE THEREOF IN ELECTRODEPOSITION

[75] Inventors: Terence J. Hart, Allison Park; Rostyslaw Dowbenko, Gibsonia; Rudolf Maska; Ellor J. Van Buskirk, both of Pittsburgh; Marvin T. Tetenbaum, Wexford, all of Pa.

[73] Assignee: PPG Industries, Inc., Pittsburgh, Pa.

[21] Appl. No.: 778,000

[22] Filed: Sep. 20, 1985

Related U.S. Application Data

[62] Division of Ser. No. 637,251, Aug. 2, 1984.

[51] Int. Cl.$^4$ .................. C08K 3/20; C08L 63/00
[52] U.S. Cl. .................. 523/409; 523/410; 523/411; 523/412; 525/109; 525/110; 525/111; 525/113

[58] Field of Search .............. 523/409, 410, 411, 412; 525/109, 110, 111, 113

[56] References Cited

U.S. PATENT DOCUMENTS

| | | | |
|---|---|---|---|
| 4,299,747 | 11/1981 | Birkmeyer | 525/113 |
| 4,341,682 | 7/1982 | Tobias | 525/109 |
| 4,383,059 | 5/1983 | Brook et al. | 523/412 |
| 4,420,574 | 12/1983 | Moriarity et al. | 525/113 |
| 4,458,040 | 7/1984 | Suzuki et al. | 523/409 |

*Primary Examiner*—Lewis T. Jacobs
*Attorney, Agent, or Firm*—Godfried R. Akorli

[57] ABSTRACT

Disclosed herein are water-based coatings comprising as an essential film-former resinous blends of acid group-containing resins and modified epoxy resins which have been found to be particularly useful as electrodepositable compositions for can coatings.

24 Claims, No Drawings

RESINOUS BLENDS OF EPOXY AND ACRYLIC RESINS AND THE USE THEREOF IN ELECTRODEPOSITION

This is a division of application Ser. No. 637,251, filed Aug. 2, 1984.

BACKGROUND OF THE INVENTION

1. Field of the Invention

The present invention relates to resinous blends of modified epoxy resins and acrylic resins. More specifically, the present invention relates to water-based coating compositions of resinous blends which have been found to be very suitable for can or coil coatings, particularly in the electrodeposition mode.

2. Brief Description of the Prior Art

Resinous blends containing acrylic and/or epoxy resins are generally known in the art. It is, however, the case generally that resinous blends are often limited in their use because of problems of incompatibility. In the area of can and coil coatings, the art has disclosed the use of resinous blends. In a rather pertinent example, the art has disclosed a method for coil coating by means of electrodeposition comprising passing a flat metal sheet in an electrodeposition bath comprising a water-soluble resinous coating material and a water-insoluble emulsified resinous material. However, many of the electrodepositable compositions in the area of can or coil coatings do not give commercially usable coatings. Electrodeposition of many coatings even where successful is attended by shortcomings pertinent among which is continuity of coatings, particularly those formed over short deposition times of about 1 to 10 seconds.

In the area of can coatings in particular, these shortcomings are unacceptable. Coatings intended for use in food and beverage industries must meet stringent requirements in order to be useful for this purpose. The coating must adhere well to the base metal and must possess a certain set of flexibility, extensibility and adhesion characteristics so as to withstand the processing of the container itself. The coating must also be able to resist heat which can be encountered during processing of the container. Additionally, the coating itself must not affect the taste of a food or beverage which is put into the coated container.

Art-known electrocoats and processes thereof have not met the stringent requirements, particularly those that relate to continuous coatings. By the present invention, there is provided a resinous blend which can be used in can and/or coil coatings.

SUMMARY OF THE INVENTION

The present invention encompasses a coating composition comprising as an essential film-former:
 (a) a resinous blend of:
  (i) from about 5 to 95 percent by weight of an amine-defunctionalized epoxy which is at least partially amidated with a polycarboxylic acid anhydride or a functional equivalent thereof; and
  (ii) from about 5 to 95 percent by weight of an acid group-containing resin having an acid value of 20 to 350, said resin being different from the resin of (i) above.

In a preferred embodiment, the present invention encompasses a water-based coating composition comprising as an essential film-former:
 (a) a base-neutralized resinous blend of:
  (i) from about 5 to 95 percent by weight of an amine-defunctionalized epoxy which is at least partially amidated with a polycarboxylic acid anhydride or a functional equivalent thereof; and
  (ii) from about 5 to 95 percent by weight of an acid group-containing resin having an acid value of 20 to 350, said resin being different from the resin of (i) above.

Preferably, the acid group-containing resins, aforedescribed, are vinyl addition resins.

The coating composition is particularly useful as an anionic electrodepositable composition comprising as an essential film-former:
 (a) an aqueous dispersion of a base-neutralized resinous blend of:
  (i) from about 5 to 95 percent by weight of an amine-defunctionalized epoxy which is at least partially amidated with a polycarboxylic acid anhydride or functional equivalent thereof; and
  (ii) from about 5 to 95 percent by weight of an acid group-containing vinyl addition resin having an acid value of 20 to 350.

The percent by weight is based on the weight of (i) and (ii) and the acid value is based on that of the respective resin solids.

In the practice of this invention, the coating compositions contain curing agents such as aminoplasts. The coatings obtained therefrom are of continuous films which have excellent enamel rating, durability and other desirable film properties.

DETAILED DESCRIPTION OF THE INVENTION

The amine-defuntionalized epoxy which is at least partially amidated is prepared as follows. Typically, the preparation entails reacting a polyepoxide resin with ammonia or an amine having at least two active hydrogen atoms, and reacting the resultant compound with a carboxylic acid anhydride or a functional equivalent thereof.

The polyepoxide resin useful herein is a compound or a mixture of compounds having more than 1.0 epoxy groups per molecule. Several polyepoxide resins are known, examples of which can be found in the HANDBOOK OF EPOXY RESINS, Lee and Neville, 1967, McGraw-Hill Book Company.

A preferred class of polyepoxides are the polyglycidyl ethers of polyphenols, such as bisphenol A. These are produced by etherification of a polyphenol with epichlorohydrin in the presence of an alkali. The phenolic compound can be 1,1-bis(4-hydroxyphenyl)ethane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; and 1,1-bis(4-hydroxy-3-allylphenyl)ethane. Another quite useful class of polyepoxides are produced similarly from polyphenol resins.

Also suitable are the similar polyglycidyl ethers of polyhydric alcohols which are derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, and 2,2-bis(4-hydroxycyclohexyl)propane.

Cycloaliphatic polyepoxide resins can also be used. Such resins are prepared by epoxidation of cyclic olefins with organic peracids, e.g., peracetic acid.

Another useful class of polyepoxides are those containing oxyalkylene groups in the epoxy molecule. Such oxyalkylene groups are typically groups of the general formula:

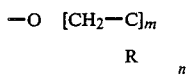

wherein R is hydrogen or alkyl, preferably lower alkyl (e.g., having 1 to 6 carbon atoms) and where, in most instances, m is 1 to 4 and n is 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy and the degree of modification desired.

In addition to the polyepoxide resins described above, addition polymerization polymers containing pendent epoxy groups are also utilized in this invention. Such polymers are made by copolymerizing a wide variety of polymerizable vinyl monomers including monomers such as glycidyl acrylate and glycidyl methacrylate. Suitable vinyl monomers include those which do not contain a group reactive with the epoxy group and preferably include the alpha, beta-ethylenically unsaturated carboxylic acid esters of saturated alcohols containing from 1 to 8 carbon atoms and the monovinyl aromatic monomers of the benzene class, e.g., styrene and vinyl toluene.

Hydantoin-based polyepoxide resins as described in U.S. Pat. No. 4,110,287, issued Aug. 29, 1978 to Bosso and Castellucci, and in an article in Die Angewandte Makromolekulare Chemie, by Jurgen Habermeier, Vol. 63, (1977), pages 63–104 (the disclosures of which are hereby incorporated by reference), can also be used.

As above indicated, the polyepoxide resin is reacted with ammonia or an amine having at least 2 active hydrogen atoms. The active hydrogen atoms can be on the same nitrogen atom, e.g., the primary amines or on different nitrogen atoms in a compound, e.g., di- or polyamines wherein the active hydrogen atoms can be on the same nitrogen atom, or on two or more nitrogen atoms. Examples of suitable primary amines include ethylamine, propylamine, isopropylamine and butylamine. Suitable di- and polyamines include hydrazine, ethylene diamine, propylene diamine, butylene diamine, hexylene diamine, diethylene triamine, tetraethylene pentamine, N-methylethylene diamine, N-methylbutylene diamine, N,N-dimethylethylene diamine, N,N-dipropylethylene diamine, and N,N-dimethylhexylene diamine. Preferably, ammonia or ethylene diamine is used.

The reaction of the polyepoxide resin with the ammonia or amine involves a simple ring opening reaction where the resultant ungelled product is the amine-terminated product of a polyepoxide resin. It is desired that substantially all of the 1,2-epoxy groups contained in the polyepoxide resin be reacted with the ammonia or amine. Thus, a molar excess, up to 10:1 excess, of the ammonia or amine to epoxy groups is used in the reaction. Even greater excesses of ammonia or amine can be used, though are avoided because of the added costs involved without any added benefits. The reaction of the polyepoxide resin with the ammonia or amine occurs over a wide range of temperatures, preferably from about 30° C. to about 100° C. The time of reaction varies according to the temperature used in the reaction.

The amino functional resin is next reacted with a cyclic anhydride of a dibasic carboxylic acid or a functional equivalent thereof. The resultant product is a carboxylated amide polymer. The carboxyl groups can be neutralized as discussed below to impart water-reducibility to the polymers. Suitable cyclic anhydrides of dibasic carboxylic acids include succinic anhydride, maleic anhydride, trimellitic anhydride, phthalic anhydride, hexahydrophthalic anhydride and chlorosuccinic anhydride. A preferred cyclic anhydride of a dibasic carboxylic acid is succinic anhydride.

Reaction of the amino functional polymer and the cyclic anhydride occurs over a wide range of temperatures, though preferably the temperature ranges from about 30° C. to about 100° C. The time of reaction is dependent on the reaction temperature used and can vary widely. Molar excesses of the anhydride are avoided because of the consequent difficulty in removing the unreacted anhydride from the reaction mixture. A molar ratio of anhydride to amino groups of from about 0.1:1 to about 2:1 are used, with the preferred molar ratio being from about 0.5:1 to about 1.2:1.

A solvent or mixture of solvents is preferably included in the reaction of the epoxy resin and ammonia or amine and/or in the anhydride reaction for the purpose of achieving better reaction control. Any nonreactive solvent can be used, examples of which include the ketones and alcohols. Specific examples of suitable solvents are methyl ethyl ketone, methyl butyl ketone, ethanol, propanol, isopropanol and butanol. Surprisingly, the alcohol can oftentimes be used as a solvent. It would be expected that the anhydride would react with it; however, the rate of reaction of the anhydride with the amine-terminated epoxy group derivative is in most cases greater than its rate of reaction with the alcoholic solvent.

The preferred vinyl addition resins have an acid value of from about 20 to about 350, preferably from about 45 to about 150. They can be formed by polymerizing from about 5 percent to about 25 percent of an alpha, beta-ethylenically unsaturated carboxylic acid with from about 75 percent to about 95 percent of at least one copolymerizable vinyl monomer. Preferred vinyl addition resins are formed from about 7 percent to about 15 percent of the alpha, beta-ethylenically unsaturated carboxylic acid and from about 85 percent to about 93 percent of the copolymerizable vinyl monomer. Examples of suitable alpha, beta-ethylenically unsaturated carboxylic acids are those containing from 3 to 8 carbon atoms such as acrylic acid and methacrylic acid, both of which are preferred. Acids such as itaconic acid, maleic acid, fumaric acid, mono-esters of unsaturated dicarboxylic acids, e.g., methyl hydrogen maleate and ethyl hydrogen fumarate as well as anhydrides where they exist, can also be used.

The copolymerizable vinyl monomer is selected from a wide variety of materials depending upon the properties desired. For example, at least a portion of the other copolymerizable monomer can be a vinyl aromatic compound such as styrene, alpha-methyl styrene, tertiary butyl styrene, vinyl toluene and vinyl xylene. Such monomers are preferred because of their good water and pasteurization resistance. Other monomers which are used are the alkyl esters of methacrylic acid which contain from 1 to 3 carbon atoms in the alkyl group. Specific examples of such esters are methyl methacrylate and ethyl methacrylate. Monomers which can be used and which provide flexibility to the coating are the alkyl esters of acrylic acid having from 2 to 12 carbon atoms in the alkyl group and alkyl esters of methacrylic acid having from 4 to 12 carbon atoms in the alkyl group. Examples of monomers of this type are ethyl acrylate, propyl acrylate, butyl acrylate, hexyl acrylate, 2-ethylhexyl acrylate, butyl methacrylate, and 2-ethylhexyl methacrylate. N-(alkoxymethyl)acrylamides and N-(alkoxymethyl)methacrylamides having 1 to 4 carbon atoms in the alkoxy group and N-methylolacrylamide and N-(methylol)methacrylamide can also be used. Still other monomers include vinyl monomers such as ethylene, propylene and the like, the vinyl halides, vinylidene halides, vinyl versatate, vinyl acetate, dialkyl maleate, allyl chloride, allyl alcohol, 1,3-butadiene, 2-chlorobutene, methyl vinyl ether, acrylamide, methacrylamide, acrylonitrile, and methacrylonitrile. Mixtures of any of the above-described vinyl monomers can be used.

Mixtures of vinyl addition resins formed separately from different monomers can also be used. A preferred mixture is based on a blend of (a) a vinyl addition resin formed from an alpha, beta-ethylenically unsaturated carboxylic acid and a copolymerizable vinyl monomer wherein at least one of the vinyl monomers is N-(alkoxymethyl)acrylamide and (b) a vinyl addition resin formed from an alpha, beta-ethylenically unsaturated carboxylic acid and a copolymerizable vinyl monomer wherein at least one of the vinyl monomers is N-methylolacrylamide. The ratio of resin (a) to resin (b) ranges from about 1:19 to about 19:1, preferably from about 1:10 to about 10:1. A particularly preferred N-(alkoxymethyl)acrylamide useful in forming resin (a) is N-(ethoxymethyl)acrylamide.

Vinyl addition resins described above can be prepared by free radical initiated polymerization of a mixture of the copolymerizable acrylic monomers by solution polymerization techniques. Usually, the monomers are dissolved in a solvent or a mixture of solvents and polymerized until the free monomeric content is reduced to below about 0.5 percent, preferably below about 0.1 percent. Examples of free radical initiators include azobis(alpha-gamma)-dimethylvaleronitrile, tertiary-butyl perbenzoate, tertiary-butyl peracetate and benzoyl peroxide.

Solvents which can be used in the polymerization step include alcohols such as ethanol, tertiary butanol, tertiary amyl alcohol; ketones such as acetone, methyl ethyl ketone; and ethers such as the dimethyl ether of ethylene glycol. The aforementioned solvents are either water-soluble or water-miscible. Moderate levels of water-insoluble solvents such as toluene can also be used. Usually, the solvent is first heated to reflux and a mixture of the monomers and the free radical initiator are added simultaneously and slowly to the refluxing solvent. Additional catalyst is optionally added and the reaction mixture held at polymerizing temperatures so as to reduce the free monomer content of the reaction mixture.

Other acid group-containing resins, having acid values of about 5 to 350 which are compatible with the modified epoxy resin in forming and using coating compositions in accordance with this invention are encompassed hereby.

The resinous blends have from about 5 percent to about 95 percent, preferably from about 20 percent to about 75 percent of the vinyl addition resin and from about 5 percent to about 95 percent, preferably from about 20 percent to about 75 percent of the modified epoxy resin. The solids content of the compositions range from about 20 percent to about 60 percent with the balance of the composition comprising water, organic solvent, or a mixture of water and organic solvent. Compositions wherein water is the major liquid carrier are preferred.

The resinous blends are prepared from the aforedescribed vinyl addition resins and modified epoxy resins in alternative ways. In one alternative, the vinyl addition resins and modified epoxy resins are separately made. The vinyl addition resin is neutralized with a suitable base either before or after blending with the modified epoxy resin and subsequently water is added to form the coating composition. Suitable bases include ammonia and primary, secondary or tertiary amines, e.g., ethanolamine, diethanolamine, N-methylethanolamine, dimethylethanolamine, methylamine, ethylamine, diethylamine, trimethylamine, triethylamine and morpholine. Usually, the pH of the final aqueous dispersion is adjusted to about 6.5 to 11.

An alternative way to prepare the resinous blends comprises blending the vinyl addition resin with the polyepoxide resin and then reacting the epoxide groups with ammonia or amine followed by amidating the resulting product by reacting the same with a polycarboxylic acid anhydride.

It is often desirable in order to get a more durable film to add an external crosslinking agent to the above-described coating compositions. Examples thereof include the aminoplast resins, phenoplast resins, and isocyanates, preferably blocked polyisocyanates. The level of crosslinking agent used as part of the film-forming resin ranges up to about 40 percent, and is preferably from about 5 percent to about 20 percent of the film-forming resin. While vinyl addition resins derived from N-alkoxymethylmethacrylamide and N-alkoxymethylacrylamide are capable of crosslinking without an external crosslinking agent, such agents can, nevertheless, still be added.

Aminoplast resins are the condensation products of an aldehyde, e.g., formaldehyde, acetaldehyde, crotonaldehyde, and benzaldehyde with an amino- or amido group-containing substance, e.g., urea, melamine, and benzoguanamine. Products obtained from the reaction of alcohols and formaldehyde with melamine, urea or benzoguanamine are preferred in the aqueous-based coating compositions because of their good water dispersibility. Useful alcohols used to make the etherified products are the monohydric alcohols, such as methanol, ethanol, propanol, butanol, hexanol, benzyl alcohol, cyclohexanol, and ethoxyethanol. An etherified melamine-formaldehyde resin is the preferred aminoplast resin. U.S. Pat. No. 4,075,141, Porter et al, Feb. 21, 1978, contains a description of useful aminoplast resins and is incorporated herein by reference.

Phenolic resins include the condensation product of an aldehyde with a phenol. Formaldehyde and acetaldehyde are preferred aldehydes. Various phenols can be used, e.g., phenol per se, cresol, p-phenylphenol, p-tert-butylphenol, p-tert-amylphenol and cyclopentylphenol. The methylolphenol ethers described in U.S. Pat. No. 2,597,330 (herein incorporated by reference) are especially useful.

A number of blocked polyisocyanates are satisfactory crosslinking agents. These agents are well known in the art. Generally, the organic polyisocyanates are blocked with a volatile alcohol, epsiloncaprolactam or ketoxime. These blocked polyisocyanates become unblocked at elevated temperatures, e.g., above about 100° C. "The Chemistry of Organic Film Formers", Robert E. Kreiger Pub. Co., copyrighted 1977, by D. H. Solomon, pages 216–217, contains a description of many blocked isocyanates that can be used here. The disclosure of this publication is herein incorporated by reference.

The ratio of the vinyl resin to the modified epoxy resin will vary depending on the nature of the resins and the type of coatings desired. In general, on a resin solids basis, from about 5 to 95 percent and preferably from about 10 to 50 percent of the vinyl resin and the remainder is the modified epoxy resin. In any case, the vinyl resin must be compatible with the modified epoxy resin. The resinous blend must be compatible with water, i.e., it must be stable or capable of being stabilized in water without "settling out" to a point where the water-based composition loses its efficacy as a film-former. Also, both resins in the form of the blend must be capable of being coated out. Preferably, they must remain dispersed or solubilized during coating.

In adapting the resinous blend to water-based compositions useful herein, the resinous blend is at least partially neutralized with a base. The bases useful herein can be organic or inorganic. Illustrative examples of the bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine and diisopropanolamine; dimethylethanolamine and diethylethanolamine; and inorganic hydroxides such as potassium and sodium hydroxide. The percent of neutralization is such as would make the resinous blends water-dispersible and electrophoretic. Typically, the resinous blend is at least partially neutralized from about 40 to 150 percent and preferably 60 to 100 percent neutralization.

The coating compositions of this invention may contain other optional components such as pigments, fillers, anti-oxidants, flow control agents, surfactants and the like.

The electrodepositable compositions of this invention typically have a resin solids content of 2 to 20 percent and preferably 5 to 15 percent. In general, the electrodeposition bath has an operating bath conductivity within 200 to 3000 micromhos and preferably within the range of 600 to 1200 micromhos. The residence time of the substrate being coated in the bath is, in general, from about 0.1 to 10, preferably 0.5 to 5 seconds.

In general, bath variables can be adjusted so as to vary coating thickness. As afore-stated, in interior can coatings, thin films are required. Hence, film thickness in this area is in the range of about 0.01 to 1.0 and preferably 0.1 to 0.5 mil. The substrates that can be electrocoated are, generally put, electroconductive substrates. In can coatings, the substrates are typically aluminum substrates.

After electrocoating, the substrate is removed and then baked in an oven at temperatures and over a period sufficient to effect cure thereof. Typically, the coated substrate is baked at temperatures of about 200° to 250° C. for about 10 seconds to 4 minutes.

The following are non-limiting examples of the invention that are intended to be illustrative as opposed to limiting the invention as claimed herein.

EXAMPLE I

A resinous blend of the present invention was prepared and used as follows.

Part 1

An acid group-containing vinyl addition resin was prepared as follows.

| Ingredients | Parts by Weight (grams) |
|---|---|
| Reactor Charge | |
| 2-Ethylhexanol | 500 |
| 2-Hexoxyethanol | 500 |
| Deionized water | 50 |
| Initiator Charge | |
| Benzoyl peroxide (78% in water) | 30 |
| Toluene | 80 |
| Methyl ethyl ketone | 80 |
| Monomer Charge | |
| Ethyl acrylate | 1020 |
| Styrene | 180.0 |
| Methacrylic acid | 150 |
| N—ethoxymethylacrylamide (36% solution in ethanol) | 417 |
| Rinse | |
| 2-Hexoxyethanol | 11.2 |
| Initiator (Scavenger) Charge | |
| Benzoyl peroxide | 14.4 |
| Methyl ethyl ketone | 75.0 |

The Reactor Charge was heated to reflux. The Initiator Charge and the Monomer Charge were added over a period of 3 hours at a temperature range of 103°–90° C. With the addition completed and over a temperature range of 90°–91° C., the rinse was added followed by addition of the Initiator (Scavenger) Charge in three equal portions. After each addition, the reaction mixture was held for 1½ hours. The resultant mixture was then cooled and stored.

Analysis: Milliequivalents of acid of 0.610, viscosity of 1250 centipoise with No. 6 spindle at 20 rpm, and percent solids of 47.

Part 2

A modified epoxy resin was prepared and blended with the above acrylic resin and as well with the other ingredients listed below.

| Ingredients | | Parts by Weight (grams) |
|---|---|---|
| EPON 1007[1] | | 159.6 |
| Butyl alcohol | Charge I | 53.2 |
| 2-Butoxyethanol | | 53.2 |
| Ammonia (28% in water) | Charge II | 30.2 |
| Succinic anhydride | Charge III | 5.3 |
| The vinyl addition resin from Part 1 | Charge IV | 177.0 |
| Diisopropanolamine | Charge V | 9.0 |
| Phenolic crosslinker[2] | Charge VI | 26.2 |
| Melamine crosslinker[3] | Charge VII | 16.3 |
| Deionized water | Charge VIII | 472.3 |

[1]An epoxy resin having an epoxy equivalent of 1847; it is available from Shell Chemical Company.
[2]METHYLON 75108 available from General Electric Company.
[3]CYMEL 1116 available from American Cyanamid Company.

Charge I was introduced into a properly equipped reaction vessel and heated to 24° C. with stirring. Charge II was then introduced below the surface level of Charge I over a period of 15 minutes. When the addition was completed, the reaction mixture was heated to 54° C. over a period of one hour. The reaction mixture was then held at 54° C. for 2 hours. Thereafter, the reaction mixture was subjected to distillation which resulted in the removal of 30.2 grams distillate. The distilland was cooled to 60° C. and Charge III was introduced therein, and the resultant mixture held for 1½ hours over a temperature range of 68°-70° C. Charge IV was then introduced into the reaction mixture which was held for 2½ hours over a temperature range of 70°-72° C. Thereafter, Charge V was introduced into the reaction mixture which was held for 30 minutes over a temperature range of 70°-72° C. Charge VI was then introduced into the reaction mixture which was held for about 15 minutes over a temperature range of 63°-68° C. Charge VII was then introduced into the reaction mixture which was held for 15 minutes at 70°-72° C. Thereafter, Charge VIII was introduced over a period of one hour. When this addition was completed, the reaction mixture was cooled to a temperature over the range of 32°-38° C. The resultant mixture was filtered and stored.

Analysis of the resultant mixture: percent solids of 29, viscosity of 132 centipoise, and percent neutralization of 69.

Part 3

An electrodepositable composition of the blend was prepared and used as follows. 11.7 grams of diisopropanolamine were used to neutralize all the remaining acid groups of the blend from Part 2.

One part by weight of the blend was dispersed in two parts by weight water to form the electrodepositable composition. An electrodeposition bath of this composition had a solids content of 10 percent and electroconductivity of 950 micromhos per can. Cans of aluminum were electrocoated with the above electrodepositable composition as follows.

Into a can filled with the electrodepositable composition and serving as an anode was inserted a cathode. A potential of 150 volts was applied across the cathode and anode for 2 seconds. Upon removing the electrodes and the electrodepositable composition from the can, it was found that films of 6 milligrams per square inch thickness were formed on the cans. The films were baked at 204° C. for 4 minutes. The baked film was smooth, clear and had excellent enamel rating.

EXAMPLE II

This example illustrates a resinous blend of the invention and the method of preparing and using same.

Part 1

The acrylic resin was prepared as follows:

| Ingredients | Parts by Weight (grams) |
| --- | --- |
| Reactor Charge | |
| 2-Butoxyethanol | 2000 |
| Methyl ethyl ketone | 50 |
| Initiator Charge | |
| Benzoyl peroxide (78% in water) | 69.8 |
| Methyl ethyl ketone | 300.0 |
| Monomer Charge | |
| Butyl acrylate | 3740 |
| Styrene | 1700 |
| Methacrylic acid | 1020 |
| Hydroxyethyl methacrylate | 340 |
| Rinse | |
| 2-Butoxyethanol | 30 |

| Ingredients | Parts by Weight (grams) |
| --- | --- |
| Initiator (Scavenger) Solution | |
| Benzoyl peroxide (78% in water) | 75 |
| Methyl ethyl ketone | 150 |

The acrylic resin was prepared in essentially the same manner as described in Example I, Part 1. Analysis: Milliequivalents of acid 0.695, viscosity of 200 centipoise with a number 6 spindle at 20 rpm and percent solids of 71.8.

Part 2

The acrylic resin was mixed with other ingredients as listed below.

| Ingredients | Parts by Weight (grams) |
| --- | --- |
| The acrylic polymer (from above) | 561.7 |
| Diisopropanolamine | 34.1 |
| Phenolic crosslinker (same as in Example I, Part 2) | 77.9 |
| Melamine crosslinker (same as in Example I, Part 2) | 112.9 |
| 2-Hexoxyethanol | 274.0 |

Part 3

This illustrates a method of preparing the modified epoxy resin. The following were used in the preparation:

| Ingredients | Parts by Weight (grams) |
| --- | --- |
| An epoxy resinous solution[1] | 9066.7 |
| 28% Ammonium hydroxide | 1256.8 |
| Succinic anhydride | 216.0 |

[1]This was prepared by reacting 3644.8 grams of EPON 828 with 5.2 grams bisphenol A in the presence of 3.6 grams of ALLON, a catalyst available from Shell Chemical Company. Using the solvents 2-butoxy-ethanol and n-butanol, the resultant product was reduced to a solids content of 60%, with an epoxy equivalent of 1511.

Into a properly equipped reaction vessel was charged the epoxy resinous solution. The ammonium hydroxide was then introduced into the vessel at a point below surface of the epoxy resinous solution. The resultant mixture was heated to about 55° C. and held thereat for 2 hours. Under a nitrogen blanket, 216 grams of the mixture was distilled off. With nitrogen blanket removed and at 58° C., the succinic anhydride was introduced into the reaction vessel. The resultant mixture was held at 58° C. for 1½ hours, heated to 70° C. and then cooled to room temperature.

Part 4

175 grams of the acrylic resin mix of Part 2 was added to 192 grams of the epoxy-modified resin of Part 3 to form a resinous blend of the invention. To the blend was added 12.2 parts by weight of diisopropanolamine, 18.2 parts by weight of phenolic and 11.4 parts by weight of melamine crosslinkers (same as described above) and 1548.2 parts by weight water to form a water-based coating composition.

An electrodeposition bath containing the resultant product, having a solids content of 11 percent and conductivity of 450 micromhos per cm was used to electrocoat aluminum cans in essentially the same manner as described in Example I. The cans were coated at 175 volts for 2 seconds to form films of 7 milligrams per square inch. The films were baked at 204° C. to form smooth clear films having an excellent enamel rating.

EXAMPLE III

This example also illustrates the resinous blends of the invention and the methods of preparing and using same.

Part 1

An acrylic resin which was prepared in essentially the same manner as in Example I, Part 1, was dispersed in water as follows.

| Ingredients | Parts by Weight (grams) |
| --- | --- |
| The acrylic resin of Example I, Part I | 425 |
| Diisopropanolamine | 34.5 |
| Deionized water | 540.5 |

The acrylic polymer was introduced into a properly equipped reaction vessel. Thereafter, the diisopropanolamine was introduced into the vessel which was heated to 70°-72° C. and held for 15 minutes. The deionized water was then introduced into the vessel to disperse the resultant reaction mixture to a solids content of 20 percent.

Part 2

The following illustrates the preparation of the amine-defunctionalized epoxy which is at least partially amidated.

| Ingredients | Parts by Weight (grams) |
| --- | --- |
| An epoxy resinous solution[1] | 1361.4 |
| Ammonium hydroxide | 216.4 |
| Succinic anhydride | 37.2 |
| Diisopropanolamine | 40.0 |
| METHYLON | 147.1 |
| CYMEL 1116 | 91.2 |
| Deionized water | 1646.3 |

[1]This was prepared in essentially the same manner as noted in Example II, Part 3, with an epoxy equivalent of 1425 and molecular weight of 10,750 and resin solids content of 64.7 percent.

Into a properly equipped reaction vessel was charged the epoxy resinous solution. The ammonium hydroxide was then introduced into the vessel at a point below surface of the epoxy resinous solution. The resultant mixture was heated to about 55° C. and held thereat for 2 hours. Under a nitrogen blanket, 216 grams of the mixture was distilled off. With nitrogen blanket removed and at 58° C., the succinic anhydride was introduced into the reaction vessel. The resultant mixture was held at 58° C. for 1½ hours, heated to 70° C. and then cooled to room temperature. The diisopropanolamine was added and the mixture was stirred. About 35 minutes thereafter, the METHYLON was added and the resultant mixture was held for 15 minutes.

Thereafter, the melamine crosslinking agent was added and the reaction mixture was held for 15 minutes. Thereafter, the deionized water was added (with stirring) over a period of 1 hour, as follows. After 950 grams of water had been added, the reaction mixture was heated to 50° C. After all the water had been added, the reaction mixture was cooled and discharged. Analysis: Viscosity 61 centipoise with number 4 spindle at 100 rpm; pH was 7.01; solids content (at 150° C.) was 32.2 percent; milliequivalents of acid was 0.129 and milliequivalents of base was 0.137.

Part 3

A resinous blend of the invention was prepared by mixing 311 grams of the above modified epoxy resin with 250 grams of the above acrylic resin, in the presence of 939 grams of water.

The blend was further reduced to a 10 percent solids with additional deionized water and aluminum cans were electrocoated therewith in essentially the same manner as described in the preceding examples. The resultant films were baked and found to have excellent properties.

EXAMPLE IV

This example further illustrates a resinous blend of the invention and the method of preparing and using same.

Part 1

A mixture of acrylic resins were employed herein as follows.

Part 1(a)

| Ingredients | Parts by Weight (grams) |
| --- | --- |
| Reactor Charge | |
| 2-Ethylhexanol | 1000 |
| Deionized water | 50 |
| Monomer Charge | |
| Ethyl acrylate | 1020.0 |
| Styrene | 180.0 |
| Methacrylic acid | 150.0 |
| N—ethoxymethylacrylamide | 417.0 |
| Initiator Charge | |
| Benzoyl peroxide | 30.0 |
| Toluene | 150.0 |
| Methyl ethyl ketone | 10.0 |
| Rinse | |
| 2-Ethylhexanol | 11.2 |
| Initiator (Scavenger) Solution | |
| Benzoyl peroxide (78% in water) | 14.4 |
| Methyl ethyl ketone | 75.0 |

The acrylic resin of Part 1(a) was prepared in essentially the same manner as described in Example I, Part 1.

Analysis: Milliequivalents of acid was 0.616, percent solids was 48.3 and viscosity was 3000 centipoise with a No. 7 spindle at 20 revolutions per minute.

Part 1(b)

| Ingredients | Parts by Weight (grams) |
| --- | --- |
| Reactor Charge | |
| 2-Hexoxyethanol | 2800 |
| Deionized water | 140 |
| Initiator Charge | |
| Benzoyl peroxide (78% in water) | 84 |
| Toluene | 210 |
| Methyl ethyl ketone | 238 |
| Monomer Charge | |
| Ethyl acrylate | 2856.0 |
| Sryrene | 504 |
| Methacrylic acid | 420 |
| N—ethoxymethylacrylamide (36% solution in ethanol) | 1167.3 |
| Rinse | |
| Hexoxyethanol | 31.3 |
| Initiator (Scavenger) Charge | |
| Benzoyl peroxide | 40.3 |

| Ingredients | Parts by Weight (grams) |
|---|---|
| Methyl ethyl ketone | 210.0 |

The acrylic resin of Part 1(b) was prepared in essentially the same manner as described in Example I, Part 1.

Analysis: Milliequivalents of acid 0.626, percent solids 48.1 and viscosity of 1800 centipoise measured with a No. 7 spindle at 20 revolutions per minute.

Part 2

A modified epoxy was prepared and blended with a mixture of the acrylic resins of Part 1(a) and (b), as well as the other ingredients listed below.

| Ingredients | | Parts by Weight (grams) |
|---|---|---|
| An epoxy resin solution[1] | ⎫ | 783.4 |
| Butyl CARBITOL | ⎬ Charge I | 16.0 |
| Butanol | | 16.0 |
| Methyl ethyl ketone | ⎭ | 34.6 |
| Ammonium hydroxide | Charge II | 108.9 |
| Succinic anhydride | Charge III | 18.7 |
| The vinyl addition resin from Part 1(a) | ⎫ Charge IV | 277.5 |
| The vinyl addition resin from Part 1(b) | ⎭ | 276.4 |
| Dimethylethanolamine | Charge V | 28.3 |
| Phenolic crosslinker[2] | Charge VI | 84.4 |
| Melamine crosslinker[3] | Charge VII | 52.3 |
| Deionized water | Charge VIII | 1533.6 |

[1]The epoxy resin solution was the same as described in Example II, Part 3.
[2]METHYLON 75108 available from General Electric Company.
[3]CYMEL 1116 available from American Cyanamid Company.

The resinous blend was prepared in essentially the same manner as described in Example I, Part 2.

Analysis: Percent solids content was 28.2, milliequivalents of acid was 0.181 and milliequivalents of base was 0.102.

An electrodepositable composition of the blend was prepared and used as follows. 709.2 grams of the resinous blend was dispersed with 1208.7 grams of water in the presence of 2.1 grams of dimethylethanolamine. An electrodeposition bath of this composition having a solids content of 10 percent was used to coat aluminum cans as follows:

Into a can filled with the electrodepositable composition and serving as an anode was inserted a cathode. A potential of 75 volts was applied across the cathode and anode for 2 seconds. Upon removing the electrodes and the electrodepositable composition from the can, it was found that films of 4 milligrams per square inch thickness were formed on the cans. The films were baked at 204° C. for 4 minutes. The baked film was smooth, clear and had excellent enamel rating.

What is claimed is:

1. A coating composition comprising as an essential film-former a resinous blend of:
   (i) from about 5 to 95 percent by weight of an amine-defunctionalized epoxy resin which is at least partially amidated with a polycarboxylic acid, an acid anhydride thereof or a functional equivalent thereof; and
   (ii) from about 5 to 95 percent by weight of an acid group-containing resin having an acid value of 20 to 350, said resin is different from the resin of (i) above;
the percent by weight is based on total resin solids.

2. A coating composition of claim 1, wherein the amine-defunctionalized epoxy resin is reacted with succinic anhydride, trimellitic anhydride, phthalic anhydride or dodecenyl succinic anhydride.

3. A coating composition of claim 2, wherein the amine-defunctionalized epoxy resin is reacted with succinic anhydride.

4. A coating composition of claim 1, wherein the acid group-containing resin is derived from copolymerizing ethylenically unsaturated monomers, at least one of which is an acid group-containing monomer.

5. A coating composition of claim 4, wherein the acid group is a carboxyl group.

6. A coating composition of claim 4, wherein at least one of the ethylenically unsaturated monomers contains an N-alkoxymethylamide group.

7. A coating composition of claim 6, wherein the N-alkoxymethylamide group-containing monomer is N-butoxymethylacrylamide, N-ethoxymethylacrylamide, N-isobutoxymethyacrylamide, N-methoxymethylacrylamide or N-methoxymethylmethacrylamide.

8. A coating composition of claim 7, wherein the N-alkoxymethylamide group-containing monomer is N-ethoxymethylacrylamide.

9. A coating composition of claim 1 which further comprises a curing agent which is an aminoplast, phenoplast or blocked isocyanate.

10. A coating composition of claim 6 which further comprises a curing agent which is an aminoplast, a phenoplast or a blocked isocyanate.

11. A water-based coating composition comprising as an essential film-former a base-neutralized resinous blend of:
    (i) from about 5 to 95 percent by weight of an amine-defunctionalized epoxy resin which is at least partially amidated with a polycarboxylic acid, an acid anhydride thereof or a functional equivalent thereof; and
    (ii) from about 5 to 95 percent by weight of an acid group-containing resin having an acid value of 20 to 350, said resin is different from the resin of (i) above;
the percent by weight is based on total resin solids.

12. A water-based coating composition of claim 11, wherein the amine-defunctionalized epoxy resin is reacted with succinic anhydride, trimellitic anhydride, phthalic anhydride or dodecenyl succinic anhydride.

13. A water-based coating composition of claim 12, wherein the amine-defunctionalized epoxy resin is reacted with succinic anhydride.

14. A water-based coating composition of claim 11, wherein the acid group-containing resin is derived from copolymerizing ethylenically unsaturated monomers, at least one of which is an acid group-containing monomer.

15. A water-based coating composition of claim 14, wherein the acid group is a carboxyl group.

16. A water-based coating composition of claim 14, wherein at least one of the ethylenically unsaturated monomers contains an N-alkoxymethylamide group.

17. A water-based coating composition of claim 16, wherein the N-alkoxymethylamide group-containing monomer is N-butoxymethylacrylamide, N-ethoxymethylacrylamide, N-isobutoxymethylacrylamide, N-methoxymethylacrylamide or N-methoxymethylmethacrylamide.

18. A water-based coating composition of claim 17, wherein the N-alkoxymethylamide group-containing monomer is N-ethoxymethylacrylamide.

19. A water-based coating composition of claim 11 which further comprises a curing agent which is an aminoplast, phenoplast or blocked isocyanate.

20. A water-based coating composition of claim 16 which further comprises a curing agent which is an aminoplast, a phenoplast or a blocked isocyanate.

21. An anionic electrodepositable composition comprising as an essential film-former:
   (A) an aqueous dispersion of a base-neutralized resinous blend of:
      (i) from about 5 to 95 percent by weight of an amine-defunctionalized epoxy resin which is at least partially amidated with a polycarboxylic acid, an acid anhydride thereof or a functional equivalent thereof; and
      (ii) from about 5 to 95 percent by weight of an acid group-containing vinyl addition resin having an acid value of 5 to 350; the percent by weight is based on total resin solids; and
   (B) a curing agent which is an aminoplast, a phenoplast or a blocked isocyanate.

22. An electrodepositable composition of claim 21, wherein at least one of the vinyl addition resins is prepared from ethylenically unsaturated monomers, at least one of which contains N-alkoxymethylamide group.

23. An electrodepositable composition of claim 22, wherein the N-alkoxymethylamide group-containing monomer is N-ethoxymethylacrylamide.

24. An electrodepositable composition of claim 21, wherein the base is an amine which is diisopropanolamine or dimethylethanolamine.

* * * * *